(12) United States Patent
Sato et al.

(10) Patent No.: US 7,075,692 B2
(45) Date of Patent: Jul. 11, 2006

(54) OPTICAL SCANNING APPARATUS AND PROJECTING APPARATUS

(75) Inventors: Hideki Sato, Kawasaki (JP); Shuichi Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 09/764,679

(22) Filed: Jan. 18, 2001

(65) Prior Publication Data

US 2001/0022673 A1 Sep. 20, 2001

(30) Foreign Application Priority Data

Jan. 20, 2000 (JP) ............................. 2000-011821

(51) Int. Cl.
  *G02B 26/08* (2006.01)
  *G02F 1/00* (2006.01)
  *G03B 21/28* (2006.01)

(52) U.S. Cl. ...................... 359/215; 359/298; 359/636; 348/759; 353/98

(58) Field of Classification Search ................ 359/196, 359/207, 212–215, 290, 298, 636; 345/48, 345/50, 55, 84, 87; 348/195, 203, 744, 759, 348/766, 771, 790–792; 353/98, 99
See application file for complete search history.

(56) References Cited

U.S. PATENT DOCUMENTS

| | | | | |
|---|---|---|---|---|
| 5,185,660 | A | * | 2/1993 | Um ............................ 348/755 |
| 5,311,360 | A |   | 5/1994 | Bloom et al. ............... 359/572 |
| 5,418,546 | A | * | 5/1995 | Nakagakiuchi et al. ....... 345/85 |
| 5,689,283 | A |   | 11/1997 | Shirochi ..................... 345/132 |
| 5,777,589 | A | * | 7/1998 | Gale et al. .................... 345/84 |
| 5,982,553 | A | * | 11/1999 | Bloom et al. ............... 359/627 |
| 6,078,420 | A | * | 6/2000 | Macken ...................... 359/208 |
| 6,215,579 | B1 | * | 4/2001 | Bloom et al. ............... 359/298 |
| 6,585,379 | B1 | * | 7/2003 | Yokoyama et al. ........... 353/31 |

FOREIGN PATENT DOCUMENTS

| | | |
|---|---|---|
| JP | 5-127113 | 5/1993 |
| JP | 6-324320 | 11/1994 |
| JP | 9-90402 | 4/1997 |

* cited by examiner

*Primary Examiner*—Mark A. Robinson
(74) *Attorney, Agent, or Firm*—Morgan & Finnegan, L.L.P.

(57) ABSTRACT

The present invention provides an optical scanning apparatus which has a light modulating element capable of changing the propagating state of light, an illuminating optical system for illuminating the light modulating element with light, and a scanning optical system for scanning the light from the light modulating element, the scanning optical system having a light deflector for selectively deflecting a beam of the light from the light modulating element which propagates in a predetermined direction, and which is made more compact than in the prior art.

14 Claims, 7 Drawing Sheets

OPTICAL SCANNING APPARATUS AND PROJECTING APPARATUS

BACKGROUND OF THE INVENTION

1. Field of the Invention

This invention relates to an optical scanning apparatus and a projecting apparatus for enlarging and displaying an image based on a light modulating element on a screen surface or the like by a projection optical system, and particularly to an apparatus adapted to display two-dimensional image information by scanning a beam based on image information light-modulated by a light modulating element in which a plurality of pixels are one-dimensionally disposed, in a direction orthogonal to the direction of arrangement of the pixels by light scanning means.

2. Related Background Art

Various projecting apparatuses for enlarging and projecting a film image, two-dimensional image information based on a liquid crystal light valve or the like onto a screen by a projection lens have heretofore been proposed and put into practical use.

FIG. 17 of the accompanying drawings shows the construction of a liquid crystal projector for enlarging and projecting two-dimensional color image information which is comprised of a plurality of liquid crystal panels. A beam from a light source, not shown, is uniformized by illuminating optical systems 102 (102a, 102b, 102c), and liquid crystal panels 103 (103a, 103b, 103c) corresponding to respective color lights are illuminated.

The liquid crystal panels 103a, 103b and 103c correspond to e.g. red, green and blue. Images displayed on the liquid crystal panels 103 are enlarged and projected onto a screen 105 by a projection optical system 104. While in this example, the liquid crystal panels 103 are transmission type liquid crystal panels, use may be made of two-dimensional image display elements such as reflection type liquid crystal panels.

In recent years, it has been required to increase the resolution of an image projected onto a screen surface. To more increase the resolution by a two-dimensional image display element, it is conceivable to increase the number of the pixels of the two-dimensional image display element.

As a method of increasing the number of the pixels of the two-dimensional image display element, there are a method of making each constituent pixel small and arranging a number of pixels, and a method of keeping the size of each pixel unchanged and arranging a number of pixels.

The former method causes the problem that the opening efficiency is reduced because each pixel becomes small. Also, in the latter method, the two-dimensional image display element becomes bulky and therefore, the projection optical system, etc. also become bulky.

In contrast, there is a method of projecting a beam from a one-dimensional image display element onto a screen while scanning it by light scanning means, and forming a two-dimensional image on the screen.

As the one-dimensional image display element, there is an image display element using a diffraction grating, and this is shown on the home page of Silicon Light Machines, Inc., U.S.A. A two-dimensional image display element using a diffraction grating is shown in U.S. Pat. No. 5,311,360, Solid State Sensors and Actuators Workshop, Hilton Head Island, S.C., Jun. 13–16, 1994.

The one-dimensional image display element in the technique shown on the home page of Silicon Light Machines, Inc. is called a one-dimensional grating light value (hereinafter referred to as "GLV"). This GLV comprises a micromachine phase reflection type diffraction grating utilizing the diffraction of light.

When this GLV is utilized, the on-off control of light can be electrically controlled to thereby form image information, and this can be used as a digital image display element.

The construction and operation principle of the GLV will hereinafter be described with reference to FIGS. 14, 15A, 15B, 16A and 16B. FIG. 14 is a perspective view of a GLV, and FIGS. 15A, 15B, 16A and 16B are views for illustrating the operation principle of the GLV.

FIG. 14 shows a GLV showing a pixel. As shown in FIG. 14, the GLV is of a construction in which a frame 15 is disposed on a substrate 14 with a spacer 16 interposed therebetween. A clearance 16a equal to the thickness of the spacer 16 is formed between the upper surface 14a of the substrate 14 and a ribbon 17, and the upper surface 14a and the ribbon 17 are in non-contact with each other.

The thickness of the clearance defined by the spacer 16 and the thickness of the ribbon 17 are both determined by the wavelength of light used, and each of them is formed as $\lambda/4$ when the wavelength of the light used is $\lambda$.

A number of pixels shown in FIG. 14 are disposed in X direction (one-dimensional direction). Such GLV can be made by the minute semiconductor manufacturing technique. The details of the making method are described in the aforementioned literature.

When comparison is made between the numbers of pixels in a case where a two-dimensional image is obtained by the use of a GLV made into a one-dimensional array and a scanning optical system and a case where a two-dimensional image is obtained by the use of a two-dimensional image display element (liquid crystal panel), the numbers of pixels in the longitudinal direction are the same in both cases, while, in the GLV, at least one pixel is enough in the lateral direction and therefore, the number of pixels becomes small. Therefore, the downsizing of the apparatus can be expected.

As an example, in a high definition television (1920×1080 pixels, HDTV: High Definition Television), the number of pixels of a two-dimensional image display element and the number of pixels of an image display element made into a one-dimensional array are compared with each other. The two-dimensional image display element has about 2,000,000 pixels, and the GLV made into a one-dimensional array has about 1,000 pixels.

That is, when the GLV made into a one-dimensional array is used, it becomes possible to obtain a two-dimensional image by pixels of 1/2000 of those of the two-dimensional image display element.

The operation of the GLV is controlled by the on-off of a voltage applied to between the ribbon 17 and the substrate 14, and FIG. 15A shows the x cross-section of the GLV during the off of the voltage, and FIG. 15B shows the y cross-section of the GLV during the off of the voltage. As shown in FIGS. 15A and 15B, the surface of the GLV during the off of the voltage is in a flat state. FIG. 16A likewise shows the x cross-section of the GLV during the on of the voltage, and FIG. 16B shows the y cross-section of the GLV during the on of the voltage. The reference character 17b designates movable ribbons, and the reference character 17a denotes fixed ribbons.

As shown in FIGS. 15A and 15B, during the off of the voltage of the GLV, the ribbons 17b, like the ribbons 17a, keep a constant distance from the substrate 14, and when in this state, an illuminating beam La enters, the total optical path difference between reflected beams reflected on the alternately provided ribbons 17a and 17b does not occur, but the GLV acts as a plane mirror and hardly diffracts and deflects the illuminating beam but regularly reflects the illuminating beam (it does not include regular reflection that light is deflected).

In FIG. 15B, the ribbons 17*b* are not lowered by an electrostatic force and the ribbons 17*a* and the ribbons 17*b* are in the same state and therefore, the ribbons 17*b* alone are shown.

On the other hand, as shown in FIGS. 16A and 16B, during the on of the voltage of the GLV, the ribbons 17*b* are lowered to the substrate 14 side by an electrostatic force, and when here the illuminating beam La enters, the total optical path difference between a beam reflected by the group of ribbons 17*a* and a beam reflected by the group of ribbons 17*b* becomes a half wavelength ($\lambda/2$). Thus, the GLV acts as a reflection type diffraction grating, and regularly reflected beams (0-order lights) interfere with each other and negate each other, and diffracted lights of other orders (here first-order diffracted lights) are created.

Also, in order to realize such a mechanical operation, the dimension, tensile stress, etc. of the ribbon 17 in the lengthwise direction thereof (Y direction) are determined with the necessary operating speed, restitutive property, etc. taken into account. According to the aforementioned literature, an operating speed of 20 μsec. is obtained when y0 which is the dimension of a diffraction effective area in the lengthwise direction (Y direction) in the ribbon 17 shown in FIG. 14 is 20 μm.

The size of a GLV in Y direction at this time is about 25 μm including the frame 15. Also, the width x0 of the ribbon 17 is determined by the wavelength and the angle of diffraction θd of the illuminating beam, i.e., $$d\sin\theta d = m\lambda. \quad (1)$$

d is the grating pitch of the diffraction grating, and is determined by the width x0 of the ribbons 17*a* and 17*b*, and becomes equal to the pitch of the ribbons 17*a* or the ribbons 17*b*. θd is the angle of the reflected beam from the GLV, λ is the wavelength of the illuminating beam, and m is the diffraction order.

An optical system or an apparatus according to the prior art for controlling the propagating state of light by the use of a light modulating element such as a GLV for modulating light chiefly by diffraction, deflection or scattering has left room for improvement in respect of size.

SUMMARY OF THE INVENTION

The present invention has as its object the provision of an optical scanning apparatus and a projecting apparatus which can be made more compact than in the prior art.

An optical scanning apparatus according to an embodiment of the present invention has a light modulating element capable of changing the propagating state of light, an illuminating optical system for illuminating the light modulating element with light, and a scanning optical system for scanning the light from the light modulating element, the scanning optical system having a light deflector for selectively deflecting a beam of the light from the light modulating element which propagates in a predetermined direction.

In the above apparatus, it is preferable that the light modulating element has the function of modulating light chiefly by diffraction, deflection or scattering, and forming a light diffracted, deflected or scattered or forming a light not diffracted, deflected or scattered, in conformity with an input signal, and comprises, for example, an electromechanical element or a liquid crystal element, and forms a light diffracted, deflected or scattered in conformity with an ON signal and forms a light not diffracted, deflected or scattered in conformity with an OFF signal.

In the above apparatus, the scanning optical system may preferably have a projection optical system for projecting the beam from the light deflector.

Also, a projecting apparatus according to another embodiment of the present invention has a light modulating element for modulating light chiefly by diffraction, deflection or scattering, an illuminating optical system for illuminating the light modulating element with light, and a scanning optical system for scanning the light from the light modulating element, the scanning optical system having a deflecting mirror for selectively deflecting a beam of the light from the light modulating element which has been subjected to the modulation, and a projection optical system for projecting the beam from the deflecting mirror.

In the above apparatus, it is preferable that the deflecting mirror have a light passing area and a light reflecting area, only the beam substantially subjected to the modulation be reflected by the light reflecting area, and only a beam substantially not subjected to the modulation pass through the light passing area.

Also, in the above apparatus, it is preferable that the light modulating element be an element which reflects the light and the light of the illuminating optical system pass through the light passing area of the deflecting mirror and enter the reflection type light modulating element.

Also, in the above apparatus, it is preferable that the illuminating optical system have a lens system of which the light modulating element side opposed to the light modulating element is telecentric, and the light from the deflection type light modulating element propagate to the position of the deflecting mirror through the telecentric lens system.

Further, in the above apparatus, it is preferable that the light modulating element have an elongate light modulating area in which a plurality of light modulating portions corresponding to pixels are arranged in a certain direction, and the illuminating optical system have one or more anamorphic optical elements for illuminating the light modulating element with a light elongate in the direction of arrangement of the plurality of light modulating portions.

Also, in the above apparatus, it is preferable that the scanning optical system scan the light from the light modulating element only in a direction orthogonal to the lengthwise direction of the light modulating area.

Also, in the above apparatus, it is preferable that the light modulating element have a light modulating area in which a plurality of light modulating portions are arranged also in the direction orthogonal to the lengthwise direction.

Also, in the above apparatus, it is preferable that the scanning optical system scan the beam from the light modulating element in the lengthwise direction of the light modulating area and a direction orthogonal to the lengthwise direction.

Also, in the above apparatus, it is preferable that the light modulating element have the function of forming a light diffracted, deflected or scattered or forming a light not diffracted, deflected or scattered, in conformity with an input signal, and comprise, for example, an electro-mechanical element or a liquid crystal element, and form a light diffracted, deflected or scattered in conformity with an ON signal and form a light not diffracted, deflected or scattered in conformity with an OFF signal.

Also, in the above apparatus, it is preferable that the light modulating element modulate light in conformity with an image signal, and a two-dimensional image is formed by the beam projected by the projection optical system.

DESCRIPTION OF THE PREFERRED EMBODIMENTS

Figure 1:
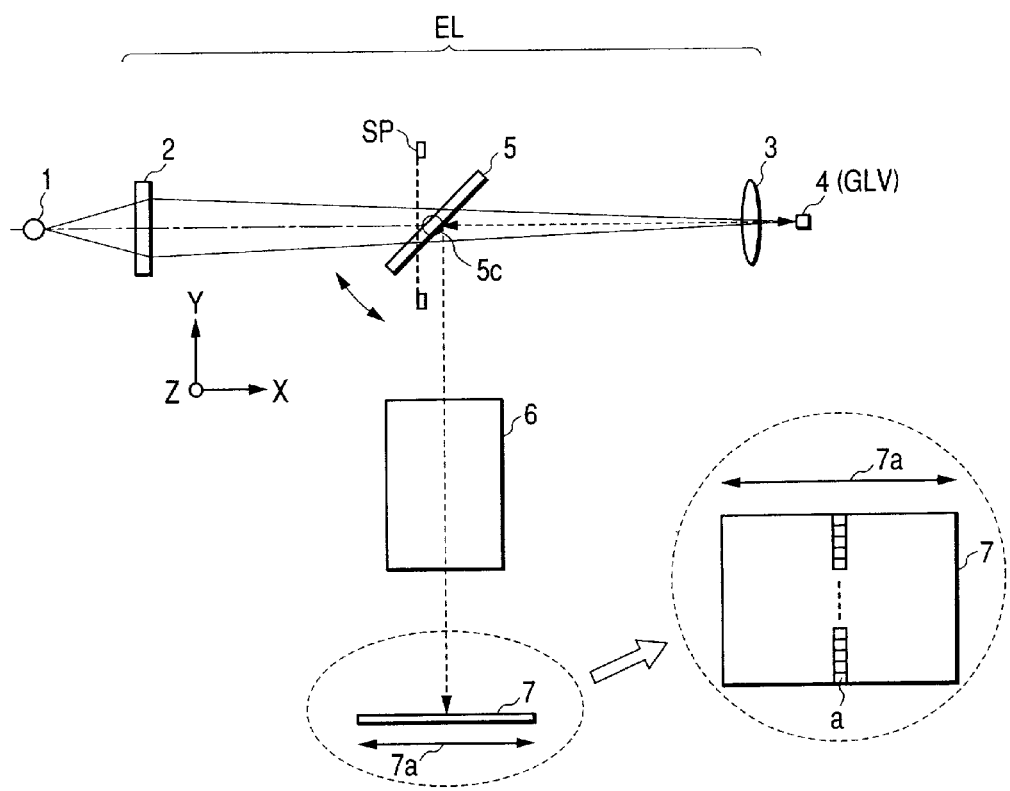
FIG. 1 is a schematic view of first embodiment of the present invention.

FIG. 1 is a schematic view of the essential portions of first embodiment of the projecting apparatus of the present invention. In FIG. 1, the reference numeral 1 designates light source means (a light source). The reference numeral 2 denotes beam shape converting means having an anamorphic optical member (such as an anamorphic lens or a pair of cylindrical lenses of which the bus lines are orthogonal to each other), and the focal lengths thereof (which are neither 0 nor ∞) differ from each other between the plane of the drawing sheet and a direction perpendicular to the plane of the drawing sheet, and this beam shape converting means converts the shape of the cross-section of a beam from the light source 1 which is orthogonal to an optical axis from a circle to an ellipse and emits it.

The reference numeral 3 designates a lens system of which the light emergence side is adapted to form a telecentric system or a substantially telecentric system with respect to a cross-section orthogonal to the plane of the drawing sheet. Accordingly, in this cross-section, the light condensing position by the beam shape converting means 2 and the light incidence side focus position of the lens system 3 are coincident with each other (see FIG. 2). The beam shape converting means 2 and the lens system 3 are the constituents of an illuminating system (illuminating optical system) EL.

The reference numeral 4 denotes a one-dimensional grating light valve (GLV) in which a plurality of pixels are arranged in a direction perpendicular to the plane of the drawing sheet (Z direction), and which comprises a micromachine phase reflection type diffraction grating shown in FIGS. 14 to 16A and 16B which creates the light diffracting action by the application of a voltage thereto.

FIG. 1 shows the optical path when the GLV 4 acts as a diffraction grating (this will hereinafter be referred to as the "ON state"), and in the ON state, reflected diffracted light from the GLV, as shown in FIG. 1, is reflected by optical scanning means 5 and arrives at a screen through a projection optical system 6.

Figure 4:
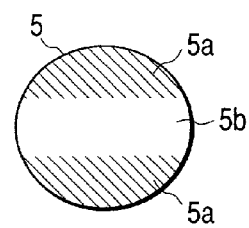
FIG. 4 is an illustration of the shape of the optical scanning means of FIG. 1.

A galvano mirror 5 which is the optical scanning means in the present embodiment is comprised of a rotatable mirror having a light transmitting portion 5b and a light reflecting portion 5a as shown in FIG. 4. The beam to be scanned is scanned on the screen 7 through the lens system 3 and the projection optical system 6, and the optical scanning means 5 is disposed near the stop of an optical system comprised of the lens system 3 and the projection optical system 6. As another embodiment, there may be a case where a rotatable polygon mirror is used as the optical scanning means.

At this time, a beam from the one-dimensional GLV 4, which is based on image information, is scanned in a sub-scanning direction (X direction) 7a by the optical scanning means 5, whereby two-dimensional image information is formed on the screen 7. Of course, the direction of arrangement of the plurality of pixels of the GLV 4 is the main scanning direction.

In FIG. 1, a beam emitted from the light source 1 passes along an optical path indicated by solid line through the beam shape converting means 2, the light transmitting portion 5b of the optical scanning means 5 and the lens system 3, and irradiates the GLV 4. A beam spatially light-modulated by the GLV 4 (hereinafter referred to as the reflected beam) is reflected and deflected by the reflecting portion 5a of the optical scanning means 5, travelling direction thereof is changed, and the modulated beam arrives at the screen 7 through the projection optical system 6 on an optical path indicated by broken line. The optical scanning means 5 is rotated (pivotally moved), whereby the direction of deflection, i.e., the direction of travel, is sequentially changed and the imaged position on the screen is also sequentially changed, i.e., scanned.

Each element will now be described. The beam shape converting means 2 has an optical member of which the radii of curvature (refractive powers) differ from each other between a cross-section in a vertical direction (Y direction) in the plane of the drawing sheet of FIG. 1 and a cross-section in a direction (Z direction) perpendicular to the plane of the drawing sheet. Use can also be made of a cylindrical lens having a radius of curvature ∞ (refractive power 0) in the cross-section in the direction perpendicular to the plane of the drawing sheet.

Design is made such that the beam emerges from the beam shape converting means 2 as an elliptical beam long in Z direction, is transmitted through the transmitting portion 5$b$ of the optical scanning means 5 which is elliptical, rectangular or of a shape (shown) comprising an arc and a straight line, and illuminates the GLV 4 through the lens 3.

Figure 6:
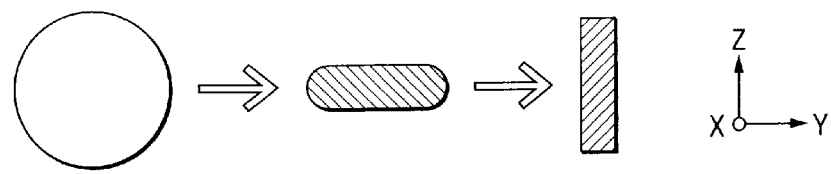
FIG. 6 is an illustration of the shape of an illuminating beam in the optical scanning means (stop) and GLV.

At this time, the beam from the light source 1 has its cross-sectional shape changed from the shape on the incidence surface of the converting means 2 via the shape on the stop SP to the shape on the GLV 4 as shown in FIG. 6 so as to correspond to the GLV 4 in which a plurality of pixels are arranged in Z direction perpendicular to the plane of the drawing sheet of FIG. 1.

In FIG. 1, the optical scanning means 5 is disposed in such a manner as to receive the beam after emerging from the beam shape converting means 2, and design is made such that the beam after emerging from the beam shape converting means 2 passes through the transmitting portion 5$b$ of the optical scanning means 5.

The optical scanning means 5, as shown in FIG. 4, has two areas, i.e., the transmitting portion 5$b$ and the reflecting portion 5$a$.

The optical scanning means 5, in FIG. 1, has a rotary shaft 5$c$ in Z direction, and is pivotally moved or rotated about this rotary shaft 5$c$.

The GLV 4 is one in which a plurality of pixels are arranged one-dimensionally in a direction perpendicular to the plane of the drawing sheet of FIG. 1 (a GLV made into a one-dimensional array), and acts as a reflection type diffraction grating (the on state) by the application of a voltage thereto, and acts as a plane mirror (the off state) when no voltage is applied thereto. The reflected beam becomes strong in the intensity of a plurality of diffracted lights such as ± first-order diffracted lights due to the diffracting action only when the GLV 4 is in the on state, and travels in each direction different from regularly reflected light (0-order light) travelling in the direction of the optical axis.

Figure 2:
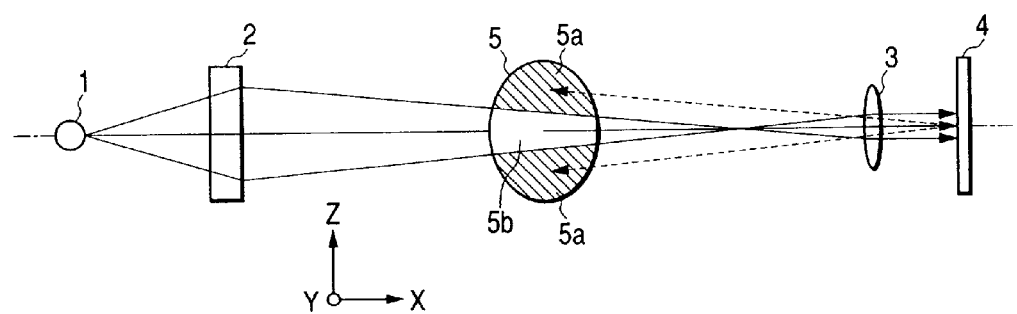
FIG. 2 is a schematic view seen from a screen 7 side in FIG. 1 (GLV: on state).

FIG. 2 shows the positional relation among the reflected beam and the transmitting area 5$b$ and reflecting area 5$a$ of the optical scanning means 5 disposed near the stop when the GLV 4 is in the on state. This figure shows a state in which in FIG. 1, the optical scanning means 5 is seen from the screen 7.

The optical system of FIG. 1, as shown in FIG. 2, is designed such that when the GLV 4 is in the on state, the illuminating beam is reflected and diffracted at an angle determined by the wavelength of the beam and the pitch of the GLV 4 and the reflected and diffracted beam is incident on the reflecting area 5$a$ of the optical scanning means 5.

The optical scanning means 5 and the projection optical system 6 are designed such that usually the reflected beam of ± first-order diffracted lights is incident on the reflecting area 5$a$ and is reflected and enters the projection optical system 6.

Figure 5:
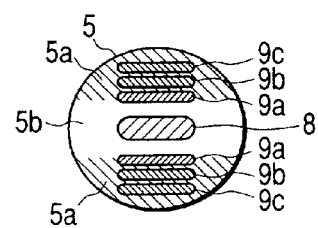
FIG. 5 is an illustration of the shapes of a transmitted beam and a reflected beam in the optical scanning means of FIG. 1.

FIG. 5 shows the manner in which high-order reflected and diffracted lights enter the optical scanning means 5. The reflected beam from the GLV 4 includes not only ± first-order diffracted lights (9$a$) but also ± second-order and higher-order reflected and diffracted lights and therefore, to obtain a brighter image, these high-order diffracted lights from the GLV 4 can be caught with the ± first-order diffracted lights by the reflecting area 5$a$.

So, the optical scanning means 5 is of such a construction that in FIG. 5, ± second-order and ± third-order diffracted lights 9$b$ and 9$c$ can also be incident on and reflected by the reflecting area 5$a$.

Figure 3:
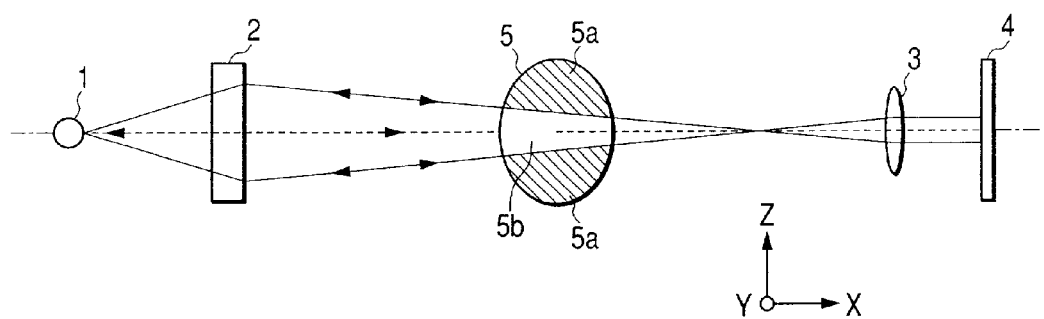
FIG. 3 is a schematic view seen from the screen 7 side in FIG. 1 (GLV: off state).

FIG. 3 shows a case where the GLV 4 is in the off state, and the beam incident on the GLV 4 is not diffracted, but is regularly reflected (that is, is not deflected) and is transmitted through the telecentric lens 3 and the transmitting portion 5$b$ of the optical scanning means disposed near the stop SP and returns to the light source 1 side. Therefore, it is not projected onto the screen 7.

FIG. 5, as previously described, shows the reflected beam from the GLV 4 on the optical scanning means 5, and in FIG. 5, the reference numeral 8 designates a beam regularly reflected by the GLV 4 when the GLV 4 is in the off state, and in FIG. 5, the reference characters 9$a$ to 9$c$ denote the reflected and diffracted beams from the GLV 4 when the GLV 4 is in the on state.

In the present embodiment, the reflecting portion 5$a$ and transmitting portion 5$b$ of the optical scanning means 5 have the same function as that of the stop of a schlieren optical system which intercepts the regularly reflected beam from the GLV 4 and extracts reflected and diffracted light.

The reflected and diffracted beam when the GLV 4 is in the on state is reflected by the reflecting area 5$a$ of the optical scanning means 5 and arrives at the screen 7 through the projection optical system 6. The optical scanning means 5 is rotated in one direction or reciprocally pivotally moved about the rotary shaft 5$c$ in a direction perpendicular to the plane of the drawing sheet in FIG. 1 (a vertical direction on the plane of the drawing sheet in FIGS. 2 and 3), whereby it scans the reflected beam from the one-dimensional GLV 4 in the sub-scanning direction 7$a$, and a two-dimensional image is projected onto the surface of the screen 7.

Also, in FIG. 1, the screen 7 as it is seen from the projection optical system 6 is shown as an inserted view. The reflected beam from the one-dimensional GLV 4 which extends in a direction perpendicular to the sub-scanning direction 7$a$ is projected onto the screen 7, and the optical scanning means 5 is rotated in one direction or reciprocally pivotally moved, whereby in the inserted view, the reflected beam is scanned in the sub-scanning direction 7$a$ which is the horizontal direction in the plane of the drawing sheet, whereby a two-dimensional image is projected.

Also, in the inserted view, the letter a indicates the projected position of the reflected beam from a pixel of the GLV 4.

As described above, the GLV 4 is used as an image display element to constitute a schlieren optical system having a light deflector such as a galvano mirror having the functions of both of optical scanning means and optical selecting means, whereby a compact optical system can be provided and a projected image of high quality is obtained on the screen 7. The construction of the GLV 4 is such as described with reference to FIGS. 14 to 16A and 16B. Besides the GLV, an element in which deformable minute mirrors capable of selectively assuming the states of regular reflection and non-regular reflection (or scattering) for reflected light are one-dimensionally arranged or a scattering type liquid crystal panel capable of selectively giving the states of regular reflection and reflection-scattering to reflected light can also be used as light modulating means.

While in the present embodiment, only the on and off states have been shown, actually gradation can be produced by controlling the phase of the GLV 4.

Figure 7:
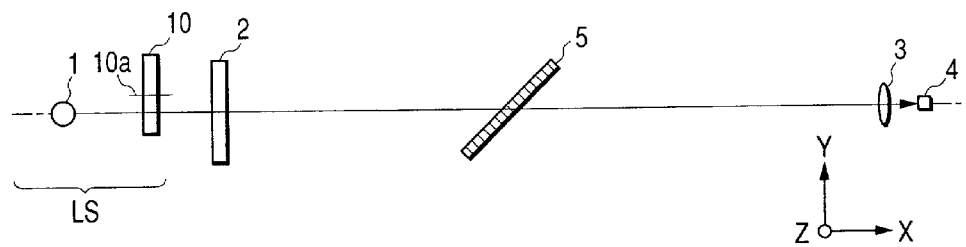
FIG. 7 is a schematic view of an illuminating system in second embodiment of the present invention (a case where a single light source and a color filter are used).

FIG. 7 is a schematic view of the essential portions of second embodiment of the projecting apparatus of the present invention. In the present embodiment, the GLV 4 is driven so as to be capable of displaying image information of each color on the basis of a color image signal, and correspondingly thereto, each color light is caused to time-divisionally enter the GLV 4 by the use of a rotatable disc 10 having R, G and B filters (color filters).

A reflected and diffracted beam which is image light from the GLV 4 is caused to enter a projection optical system (not shown) through the lens system 3 and the optical scanning means 5, and the reflected and diffracted light is projected onto a screen, not shown, by the projection optical system, not shown, while being scanned by the optical scanning means 5, and a two-dimensional image is formed on the screen (see FIG. 1). In the drawings of all the subsequent embodiments including this embodiment, the projection optical system and the screen are not shown.

Light source means LS has a white light source 1 having a light emission spectrum in the visible area, and a rotatable filter disc 10 having a plurality of color filters (R, G and B filters).

In FIG. 7, a white illuminating beam emitted from the white light source 1 passes through a color filter of the color filter disc having red, green and blue color filters and becomes a light of the color corresponding to that filter, and illuminates the one-dimensional GLV as a linear beam extending in the same direction as the GLV, through the beam shape converting means 2, the transmitting portion of the optical scanning means 5 and the lens 3. The construction and action of each of the other members than the color filter disc are similar to those in the first embodiment 1.

The optical path view of the reflected beam from the GLV 4 and the method of forming a two-dimensional image are similar to those in the first embodiment and therefore are omitted.

In the present embodiment, the color filter disc 10 is rotated about a shaft 10*a* and the illuminating beam entering the GLV 4 is made red, green and blue in succession, whereby the one-dimensional GLV is time-divisionally illuminated by lights of different colors, i.e., R, G and B, and in conformity therewith, a predetermined color beam from the color filter is modulated on the basis of a color image signal by the GLV 4. On the basis of the filtering (the extraction of only ± first-order diffracted lights) by the optical scanning means 5, the color image light based on the GLV 4 is projected onto the screen by the projection optical system. Also, the GLV and the color filters are synchronized with each other.

Figure 8:
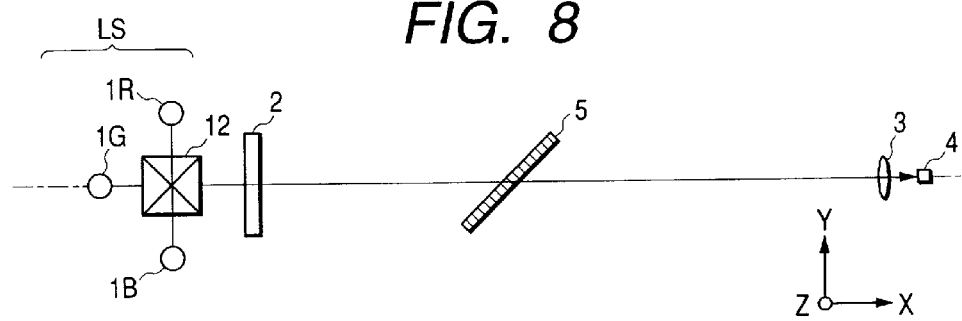
FIG. 8 is a schematic view of an illuminating system in third embodiment of the present invention (a case where three color light sources and a cross dichroic prism are used).

FIG. 8 is a schematic view of the essential portions of third embodiment of the projecting apparatus of the present invention. The difference between the present embodiment and the aforedescribed embodiment resides in only the construction of the light source means LS. The light source means LS in the present embodiment has a plurality of light sources (1R, 1G and 1B) and color combining means 12. FIG. 8 shows a case where use is made of three monochrome light sources (1R, 1G and 1B) emitting red, green and blue color lights and the three light sources are successively caused to emit light, and the GLV 4 is linearly illuminated by the beams from these light sources emitting light time-divisionally.

The optical paths of the beams successively emitted from the light sources (1R, 1G and 1B) are combined together by a conventional cross dichroic prism (color combining means) 12, whereby a predetermined common optical path is formed. This common optical path is supplied onto a segment linking the centers of the light transmitting area of the optical scanning means 5, the telecentric lens 3 and the GLV 4 together. This segment and the optical axis of the lens 3 are coincident with each other. The cross dichroic prism 12 is a prism comprising four rectangular prisms cemented together, wavelength selective reflecting film (dichroic film) coating the cemented surfaces being designed to cross, and the thickness of the dichroic film is very small and the dichroic film has little or no influence on the optical performance (imaging performance) of the illuminating optical system EL, and is suited for maintaining good optical performance. The light source means LS may be made into such a construction to thereby obtain an effect similar to that of the aforedescribed embodiment.

In the present embodiment, all of the three light sources may be white light sources and the white light sources may be caused to emit light time-divisionally to thereby successively obtain illuminating lights of three colors R, G and B through the cross dichroic prism 12, and the GLV 4 may be illuminated with the illuminating lights of the respective colors in succession.

Figure 9:
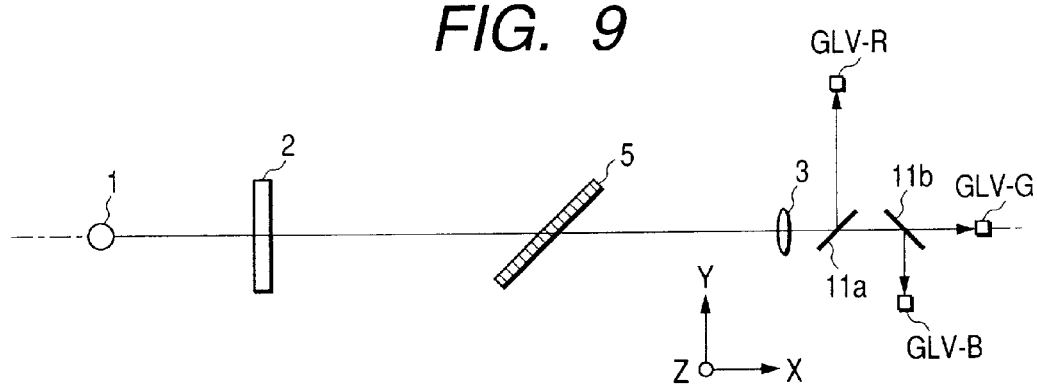
FIG. 9 is a schematic view of an illuminating system in fourth embodiment of the present invention (a case where a dichroic mirror is used).

FIG. 9 is a schematic view of the essential portions of fourth embodiment of the projecting apparatus of the present invention. In the present embodiment, white light from a light source 1 emitting white light is passed through the anamorphic optical system 2, the light transmitting area of the optical scanning means 5 and the telecentric lens 3 as in each of the aforedescribed embodiments, and thereafter is divided into three red, green and blue color lights by the use of dichroic mirrors 11*a* and 11*b*, and one-dimensional GLV-R, GLV-G and GLV-B disposed on optically the same optical axis and at the same position and provided for the respective color lights are linearly illuminated with the corresponding color lights at a time.

The one-dimensional GLV-R, GLV-G and GLV-B modulate the corresponding color lights in conformity with an image signal and form a beam having color image information.

In FIG. 9, the white illuminating beam emitted from the single light source 1 is passed through the beam shape converting means 2, the transmitting portion 5*b* of the optical scanning means 5 and the lens 3, is incident on the two dichroic mirrors 11*a* and 11*b* (mirrors coated with dichroic film) and is color-resolved by these mirrors, and the GLV's (GLV-R, GLV-G, GLV-B) are linearly illuminated at a time with the resolved color lights.

The construction and individual or mutual action of the other members in the present embodiment are similar to those in the first embodiment. The optical path view after the combination of the reflected beams from the respective GLV's and the method of forming a two-dimensional image are similar to those in the first embodiment.

As regards the white illuminating beam after passed through the telecentric lens 3 of which the light emergence side is telecentric, one color beam of the red, green and blue components thereof is reflected by the dichroic mirror 11*a*, and of the remaining two color beams transmitted through the dichroic mirror 11*a*, one color light is reflected by the dichroic mirror 11*b* and the other color light is transmitted through the dichroic mirror 11*b*. The beams divided into three colors red, green and blue illuminate the one-dimensional GLV's corresponding to the different colors.

Reflected and diffracted light having image information of each color obtained by the illuminating beams of the respective colors being modulated by the three one-dimensional GLV's passes an optical path converse to the illuminating optical path, enters the projection optical system (projection lens) by the optical scanning means 5, and is projected onto the screen by this projection optical system and a color image is displayed on the screen.

Figure 10:
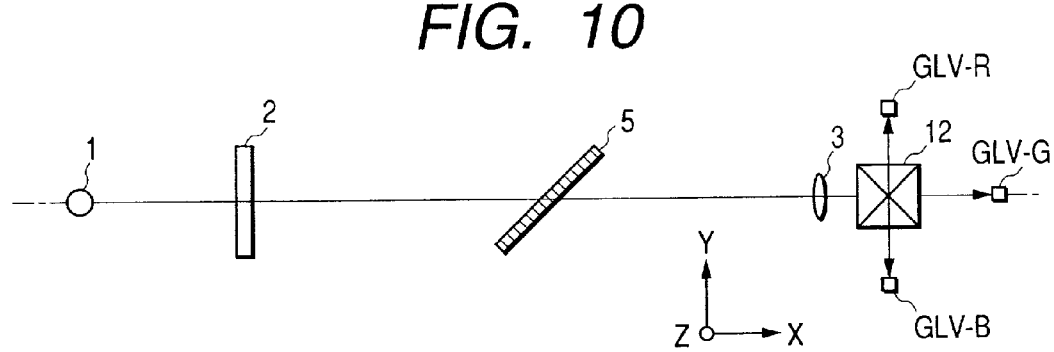
FIG. 10 is a schematic view of an illustrating system in fifth embodiment of the present invention (a case where a cross dichroic prism is used).

FIG. 10 is a schematic view of the essential portions of a fifth embodiment of the projecting apparatus of the present invention. Comparing this embodiment with the fourth embodiment of FIG. 9, this embodiment is characterized in that in order to color-resolve white light into three color lights, a single cross dichroic prism is used instead of the dichroic mirror assemblies 11a and 11b in the embodiment of FIG. 9, and except for this prism, the construction and operational effect of the apparatus are similar to those of the embodiment shown in FIG. 9.

Figure 11:
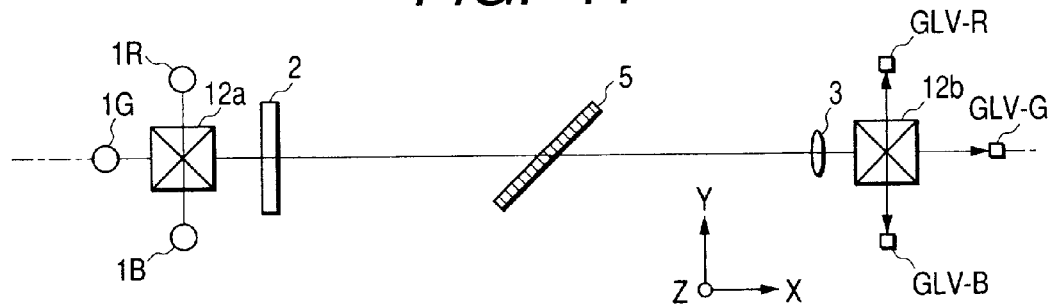
FIG. 11 is a schematic view of an illuminating system in sixth embodiment of the present invention (a case where three color light sources are illuminated by a cross dichroic prism and color resolving is effected again).

FIG. 11 is a schematic view of the essential portions of sixth embodiment of the projecting apparatus of the present invention. In this embodiment, the side more adjacent to the light sources than the anamorphic optical system 2 is comprised of three monochrome light sources (1R, 1G and 1B) and a cross dichroic prism (color combining element) 12a similar to those in the third embodiment shown in FIG. 8, and the side more adjacent to the GLV's than the telecentric lens 3 is comprised of three GLV's (GLV-R, GLV-G and GLV-B) and a cross dichroic prism (color resolving and color combining element) 12b similar to those in the embodiment shown in FIG. 10.

In the present embodiment, color lights emitted from the light sources (1R, 1G and 1B) are combined together by the cross dichroic prism 12a, and thereafter the resultant beam is passed through the beam shape converting means 2, the transmitting portion 5b of the optical scanning means 5 and the lens 3, and thereafter is caused to enter the cross dichroic prism 12b.

The beam is then color-resolved by the cross dichroic prism 12b, and R, G and B color lights linearly illuminate the corresponding one-dimensional GLV's (GLV-R, GLV-G, GLV-B). The dichroic mirror assemblies 11a and 11b shown in FIG. 9 can also be used instead of the prism 12a and the prism 12b.

The present embodiment can also obtain an effect similar to that of each of the aforedescribed embodiments.

Figure 12:
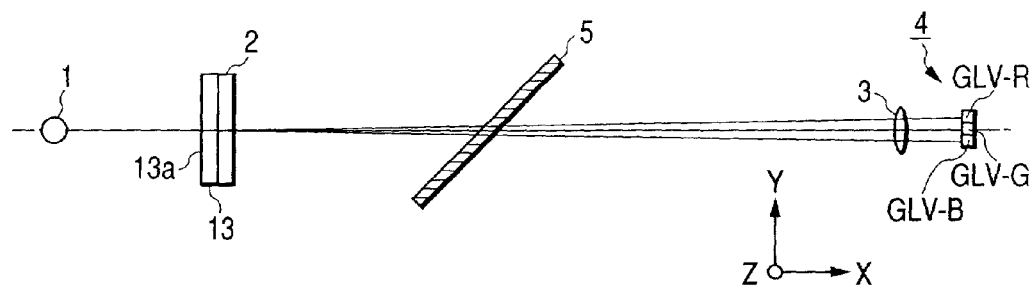
FIG. 12 is a schematic view of an illuminating system in seventh embodiment of the present invention (a case where a diffraction grating is used).

FIG. 12 is a schematic view of the essential portions of a seventh embodiment of the projecting apparatus of the present invention. The features of the present embodiment are that unlike the aforedescribed embodiments a diffraction grating (a one-dimensional brazed diffraction grating) is used as means for resolving a white beam from a white light source into R (red), G (green) and B (blue) beams and that three one-dimensional GLV's corresponding to the beams of the respective colors are arranged.

In FIG. 12, a white illuminating beam from a single light source 1 is color-resolved into R, G and B color lights by a color resolving diffraction element 13 provided on the light source side of the beam shape converting means 2, and the beams of the respective colors linearly illuminate the one-dimensional GLV's (GLV-R, GLV-G, GLV-B) disposed for the respective colors through the anamorphic lens 2 which is the beam shape converting element, the transmitting portion 5b of the optical scanning means 5 and the telecentric lens 3 of which the light emergence side is telecentric.

The construction and action of each GLV are similar to those in the first embodiment and therefore need not be described. The optical path of the reflected and diffracted beam from each of the three one-dimensional GLV's is also substantially similar to that in the first embodiment and therefore is not shown.

That surface 13a of the color resolving diffraction element 13 in FIG. 12 which is adjacent to the light source has a shape similar to that of a one-dimensional brazed diffraction grating, as shown, for example, in Japanese Patent Application Laid-Open No. 6-11662.

While in the present embodiment, the diffraction element 13 is provided integrally with the beam shape converting means 2 on the light source 1 side of this means 2, the diffraction element 13 may be disposed integrally with the beam shape converting means 2 on the optical scanning means 5 side of this means 2, or may be disposed not integrally with but independently of the beam shape converting means 2 on the light source side or the optical scanning means 5 side of this means 2.

In the arrangement of the three GLV's shown in FIG. 12, the position at which the reflected beams from the three GLV's arrive at the optical scanning means 5 somewhat differs from one color light to another. Therefore, images of the respective colors are projected side by side on the screen, not shown. As an example for solving it, a method of providing a diffraction grating on the light reflecting area of the optical scanning means 5.

That is, by the diffraction grating provided on this light reflecting area, the diffracted positions of the reflected and diffracted lights of the respective colors are made substantially the same, whereby images of the respective colors can be superimposed and projected onto the same position on the screen, not shown. Also, by contriving the construction of the projection optical system, not shown, images of the respective colors may be provided onto the same position on the surface of the screen.

Use may also be made of a method of effecting scanning by rotating or reciprocally pivotally moving the optical scanning means at a speed whereat the separation of the colors cannot be perceived by human eyes or a higher speed.

The disposition of the plurality of GLV's in the present embodiment is done in the way of juxtaposing three. The disposition of the plurality of GLV's is not limited to this disposition, but yet it is desirable to juxtaposed three in proximity with one another because if the GLV's are separate from one another, the separation of the images of the respective colors on the screen will also become great.

As described above, the one-dimensional GLV's are linearly illuminated by the beams of the respective colors formed by the use of a diffraction element, a color image of high quality can be projected onto the surface of the screen by a simple construction without using a plurality of dichroic mirrors or dichroic prisms.

Figure 13:
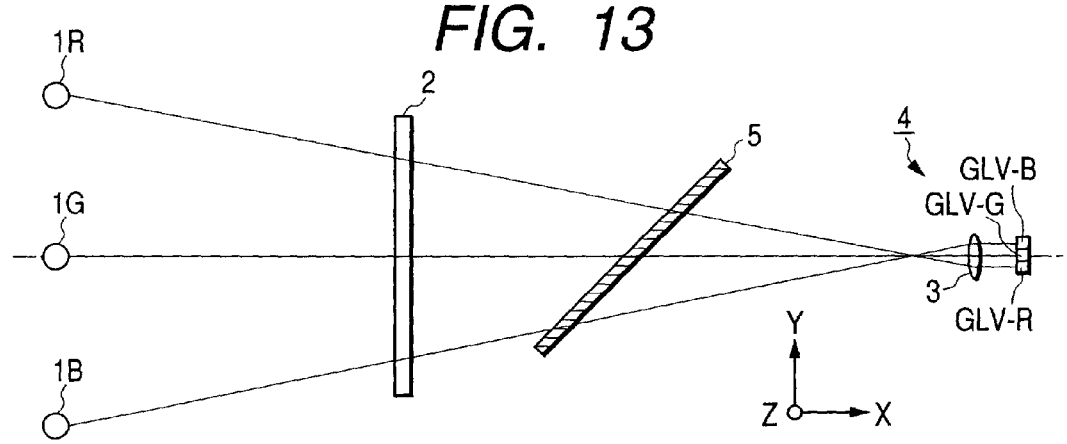
FIG. 13 is a schematic view of an illuminating system in eighth embodiment of the present invention (a case where three color light sources are directly illuminated).
Figure 14:
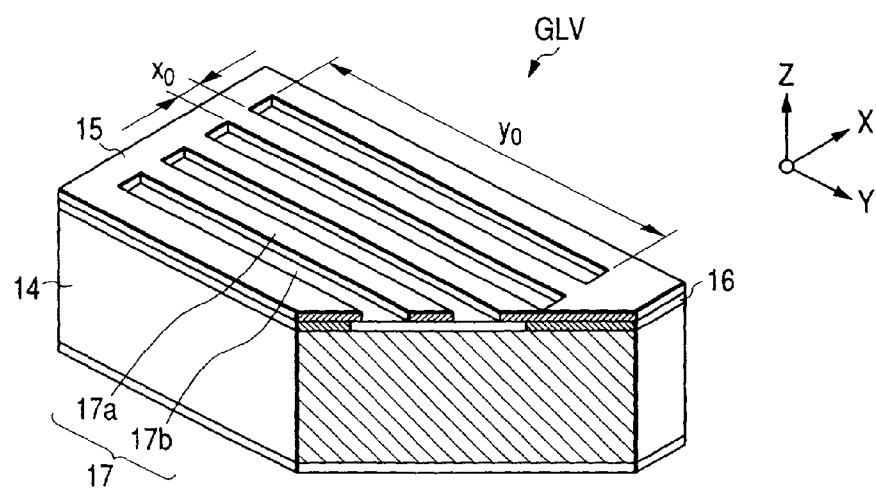
FIG. 14 is a perspective view of a GLV according to the prior art.
Figure 15A:
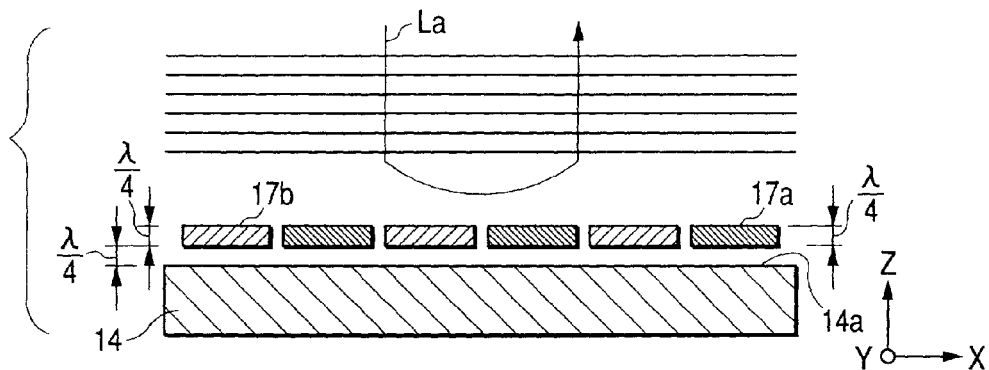
FIGS. 15A and 15B illustrate the operation principle of the GLV according to the prior art in the off state thereof.
Figure 15B:
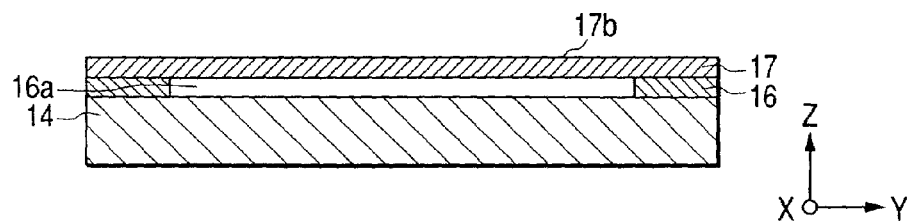
Figure 16A:
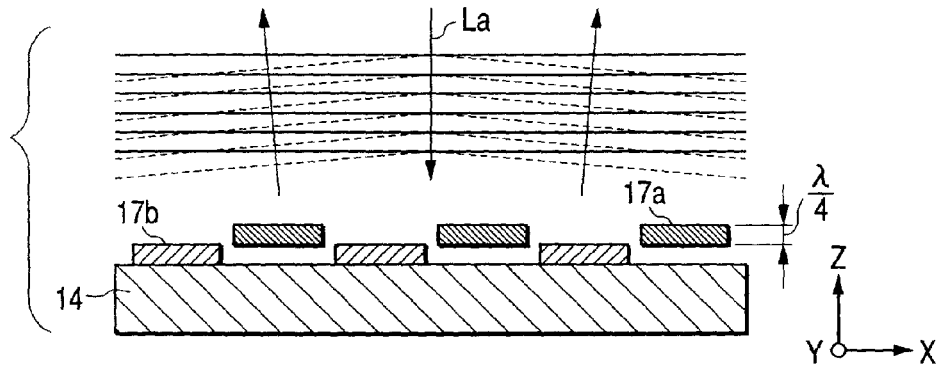
FIGS. 16A and 16B illustrate the operation principle of the GLV according to the prior art in the on state thereof.
Figure 16B:
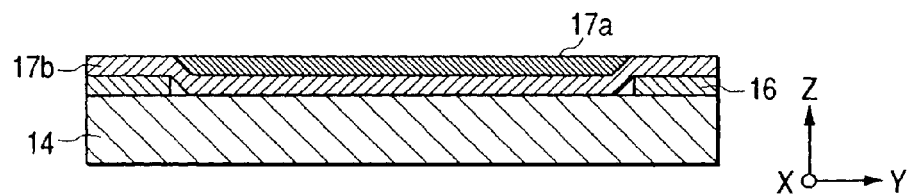
Figure 17:
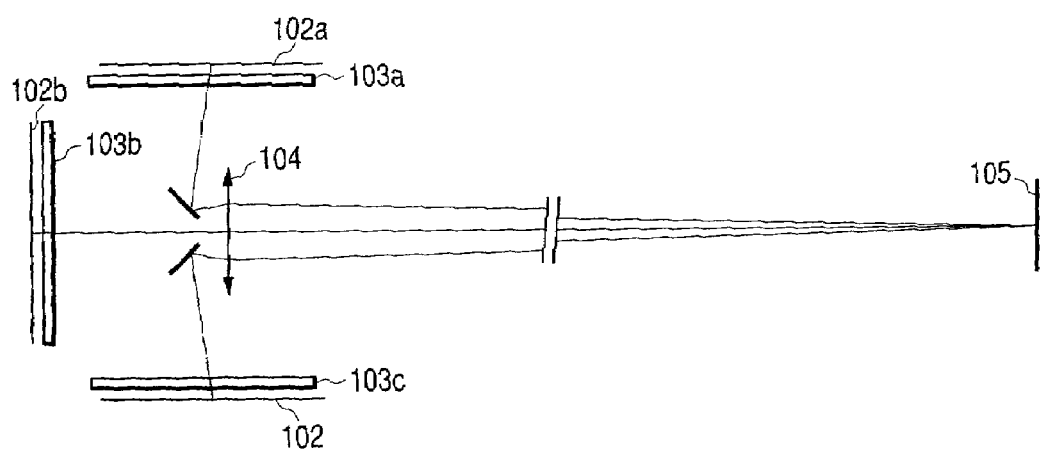
FIG. 17 is a schematic view of the essential portions of a color liquid crystal projector according to the prior art.

FIG. 13 is a schematic view of the essential portions of an eighth embodiment of the projecting apparatus of the present invention. The present embodiment, unlike the embodiment of FIG. 12, is characterized in that three monochrome light sources (1B, 1G and 1R) emitting different color lights (blue, green and red) are used and a diffraction element is not used as a color resolving element, and FIG. 13 shows a case where these three monochrome light sources are juxtaposed and their optical axes are inclined with respect to one another and one-dimensional GLV's which are the objects are linearly illuminated with three red, green and blue lights by the use of an anamorphic lens 2.

While the present embodiment, unlike the aforedescribed embodiments, does not use any means for color combination or color resolving, again this construction can obtain an effect similar to that of each of the aforedescribed embodiments.

In the projecting apparatus of the present invention, the construction of the light source side and the construction of the GLV side may be extracted from the construction in each embodiment and may be arbitrarily combined together and constructed.

Also, in the present invention, use can be made of light modulating means in which two or more pixels are arranged in the sub-scanning direction and a number of groups of these two or more pixels are arranged in the main scanning direction.

In the above-described embodiments, the anamorphic optical system 2 and the telecentric lens 3 may be placed on the optical path of not a white light source but each color light.

In the above-described embodiments as well as in the first embodiment, not GLV's but modulating elements of other types can be used as the light modulating means.

According to each of the above-described embodiments, there can be provided a simple or compact optical scanning apparatus and projecting apparatus.

What is claimed is:

1. A projecting apparatus having:
   a reflection type light modulating element for modulating light by diffraction, deflection or scattering;
   a scanning optical system for selectively reflecting a first beam incident into a reflection area of said scanning optical system, scanning a plane to be projected with the reflected first beam, and transmitting a second beam incident into a transmission area of said scanning optical system; and
   an illuminating optical system including a lens system, for illuminating said reflection type light modulating element with illumination light from a light source,
   wherein said illuminating optical system illuminates said reflection type light modulating optical element with light which has transmitted through the transmission area of said light scanning optical system, and
   wherein a reflection type light modulating element side of said lens system is telecentric, and
   wherein the reflection area includes two of reflection portions, and the transmission area is located between two of the reflection portions.

2. A projecting apparatus according to claim 1, wherein said light modulating element has an elongate light modulating area in which a plurality of light modulating portions corresponding to pixels are arranged in a certain direction, and said illuminating optical system has one or more anamorphic optical elements for illuminating said light modulating element with a light elongate in the direction of arrangement of said plurality of light modulating portions.

3. A projecting apparatus according to claim 2, wherein said scanning optical system scans the beam from said light modulating element only in a direction orthogonal to the lengthwise direction of said light modulating area.

4. A projecting apparatus according to claim 3, wherein said light modulating element has a light modulating area in which a plurality of light modulating portions are arranged also in the direction orthogonal to said lengthwise direction.

5. A projecting apparatus according to claim 2, wherein said scanning optical system scans the light from said light modulating element in the lengthwise direction of said light modulating area and a direction orthogonal to said lengthwise direction.

6. An image display apparatus for projecting an image onto a display plane, comprising:
   a light modulating element which changes, in a predetermined plane, an emerging direction of an emerging light emerged from the light modulating element on the basis of an image signal; and
   a scanning mirror which has a reflection area for reflecting a part of the emerging light and scanning the display plane with the part of the emerging light, and a transmission area for transmitting another part of the emerging light, and which rotates about an axis perpendicular to the predetermined plane,
   wherein a direction along which the part of the emerging light emerges from the light modulating element is different from a direction along which the another part of the emerging light emerges from the light modulating element.

7. An image display apparatus according to claim 6, wherein the light modulating element is capable of changing the emerged direction of light emerged from the light modulating element by a diffraction, polarization, or scattering, and further capable of stopping affects of the diffraction, polarization or scattering.

8. An image display apparatus according to claim 6, further comprising an illumination optical system which guides light from a light source to the light modulating element, and a projection optical system which projects light from the scanning optical system onto the display plane.

9. An image display apparatus comprising:
   a light modulating element capable of changing an emerging direction of light emerged from the light modulating element; and
   a scanning optical system having a reflection area which reflects and scans an emerged light emerged from the light modulating element as an image light, and a transmission area which transmits light emerged which is not the image light in a direction different from that of the image light.

10. An image display apparatus according to claim 9, further comprising: a projection optical system which projects on a surface to be scanned the image light reflected and scanned by the scanning optical system.

11. An image display apparatus according to claim 10, wherein the light which is not the image light is practically made incident into the projection optical system.

12. An image display apparatus according to claim 9, wherein the light modulating element is capable of changing the emerged direction of light emerged from the light modulating element by a diffraction, polarization, or scattering, and further capable of stopping affects of the diffraction, polarization or scattering.

13. An image display apparatus according to claim 9, further comprising an illumination optical system which guides light from a light source to the light modulating element, and
   wherein the illumination optical system guides the light from the light source to the optical modulating element through the transmission area.

14. An image display apparatus for projecting an image onto a display plane, comprising:
   a light modulating element which changes, in a predetermined plane, an emerging direction of an emerging light emerged from the light modulating element on the basis of an image signal;
   a scanning optical system which has a reflection area for reflecting a part of the emerging light as an image light and scanning the display plane with the part of the emerging light, and a transmission area for transmitting another part of the emerging light, and which rotates about an axis perpendicular to the predetermined plane, wherein the reflection area includes two of reflection portions, and the transmission area is located between two of the reflection portions;
   an illuminating optical system which illuminates the light modulating element with illumination light from a light source, by transmitting the illumination light through the transmission area without passing through the reflection area;
a stop located near the scanning optical system; and
a projection optical system which projects the image light on the display plane,
wherein a direction along which the part of the emerging light emerges from the light modulating element is different from a direction along which the another part of the emerging light emerges from the light modulating element, and the another part of the emerging light is not substantially incident into the projection optical system.

* * * * *